Sept. 7, 1965  E. J. JUSTUS ETAL  3,205,128
SHELL MAKING
Filed Jan. 22, 1962  17 Sheets-Sheet 8

INVENTORS
Edgar J. Justus
Donald A. Brafford
BY Arnold J. Roerig
Lloyd Hornbostel
ATTORNEYS Sept. 7, 1965 E. J. JUSTUS ETAL 3,205,128
SHELL MAKING
Filed Jan. 22, 1962 17 Sheets-Sheet 9

INVENTORS
Edgar J. Justus
Donald A. Brafford
BY Arnold J. Roerig
Lloyd Hornbostel Jr.
ATTORNEYS Sept. 7, 1965  E. J. JUSTUS ETAL  3,205,128
SHELL MAKING
Filed Jan. 22, 1962  17 Sheets-Sheet 15

INVENTORS
Edgar J. Justus
Donald A. Brafford
BY Arnold J. Roerig
Lloyd Hornbostel Jr.
ATTORNEYS

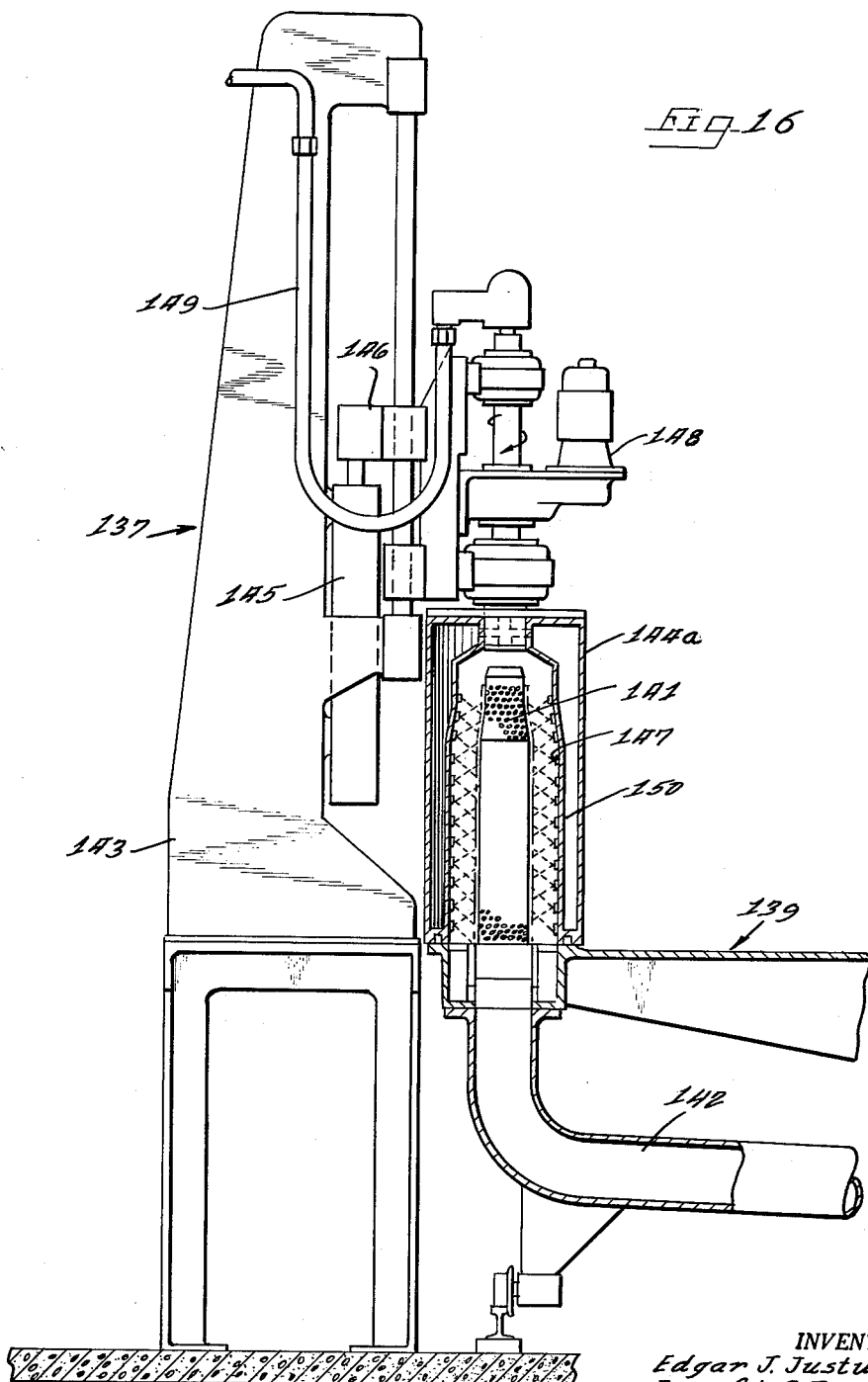

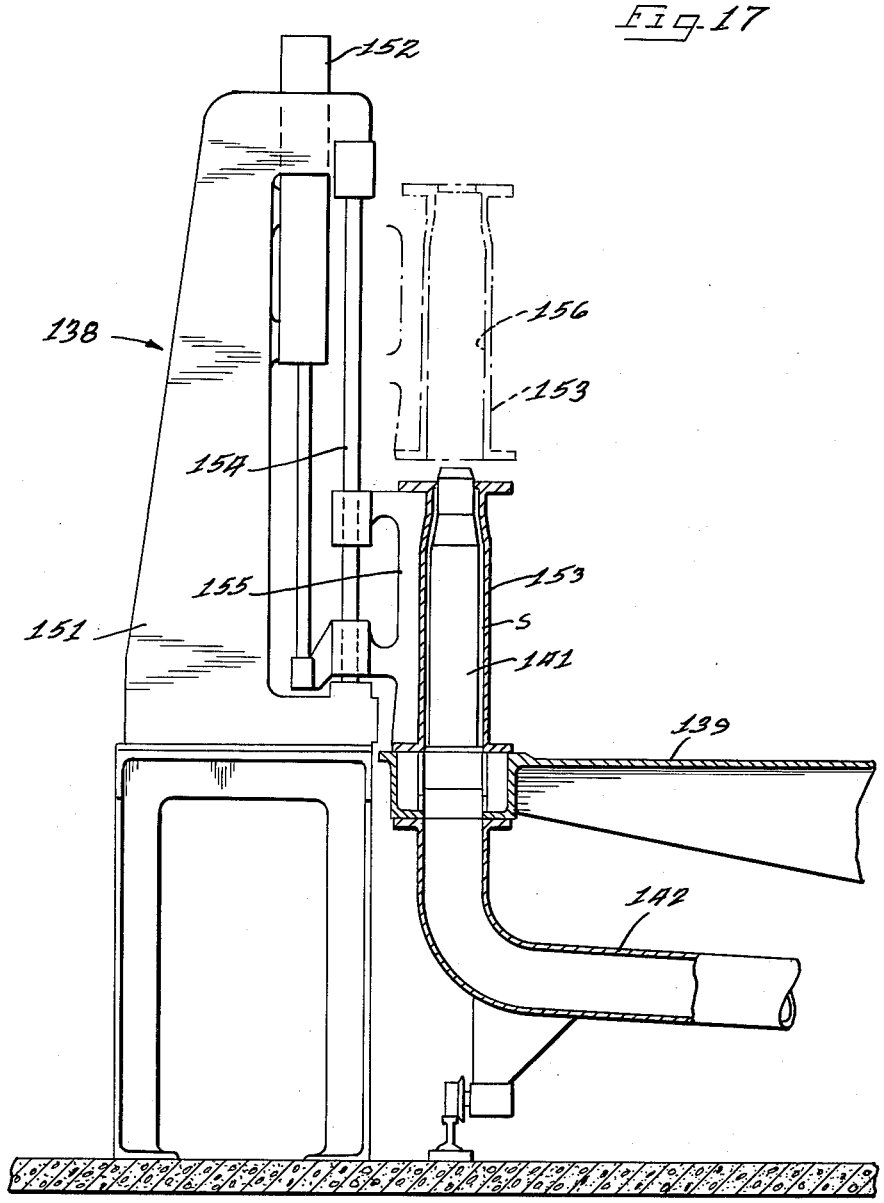

United States Patent Office 3,205,128
Patented Sept. 7, 1965

3,205,128
SHELL MAKING
Edgar J. Justus, Donald A. Brafford, Arnold J. Roerig, and Lloyd Hornbostel, Jr., all of Beloit, Wis., assignors to Beloit Iron Works, Beloit, Wis., a corporation of Wisconsin
Filed Jan. 22, 1962, Ser. No. 168,588
12 Claims. (Cl. 162—401)

The present invention relates to an improved apparatus and method for forming shells or hollow forms from a liquid suspension of fibers.

More particularly, the invention pertains to forcing a fluid stock having a suspension of particles or fibers through the porous wall of a mold to deposit the fibers on a forming surface to directly form an article or shell of a desired shape. The apparatus and method are particularly well adapted to the formation of hollow tubular shaped thin walled shells which are uniform in thickness and have an accurate outer dimension and are strong. The manufacture of these shells in accordance with the principles of the invention involves forming by depositing fibers from the stock on the wall of the form, impregnating the shell with an impregnant binder, sizing the shell to an accurate shape and size, subjecting the shell to controlled drying and curing operations and trimming the edges of the shell. As will be understood from the description and claims, certain steps of the operation may be varied or performed in different sequences and portions of the operations may be used in various environments taking advantage of the features of the invention which lie in the combinations and subcombinations herein disclosed.

The mechanism and apparatus of the invention overcome certain difficulties inherent in the formation of a thin walled shell which in previous arrangements made it difficult to control accurate sizing and uniform formation of the shell. Difficulties were also encountered in the handling and transfer of the shell particularly where manufacture on the basis of a substantial production was contemplated. The present arrangement is particularly well suited to rapid production operation for the mass production of shells. As will be understood the shells have various useful purposes such as for containers wherein a strong, light weight shell or casing is required having an outer surface free of imperfections, and wherein a tubular shell must be provided of a predetermined linear outer profile with an accurate circular cross section and having an accurate outer diameter.

An object of the present invention is to provide an improved method and mechanism for making hollow shells wherein the shells are accurately formed and sized on the inner surface of a hollow mold.

A further object of the invention is to provide an improved method and mechanism for the improved depositing of fibers on the surface of a perforate mold for the formation of a shell of uniform diameter, accurately controlling the supply of stock to the mold and the flow of fluid through the mold wall for improved depositing of fibers.

A further object of the invention is to provide an improved mechanism and method for handling and transferring a hollow shell formed of deposited fibers for impregnating the fibers with a binder and for drying and sizing the shell.

A further object of the invention is to provide an improved arrangement for controllably drying an exposed surface of the formed shell and separating the unexposed surface from the mold while it is moist.

A still further object of the invention is to provide an improved machine which will rapidly produce hollow shells transporting them through a sequence of manufacturing operations and completing the finished shell at a minimum cost and with a minimum of manufacturing delay.

Another object of the invention is to provide a mechanism employing improved basic operational steps which can be interchanged for the selection of different manufacturing processes.

Other objects, advantages and features will become more apparent with the teaching of the principles of the invention in connection with the disclosure of the preferred embodiments thereof, in the specification, claims and drawings, in which:

FIGURE 16 is a vertical sectional view taken substantially along line XVI—XVI of FIGURE 14; and FIGURE 17 is a vertical sectional view taken substantially along line XVII—XVII of FIGURE 14.

As shown on the drawings:

Figure 1:
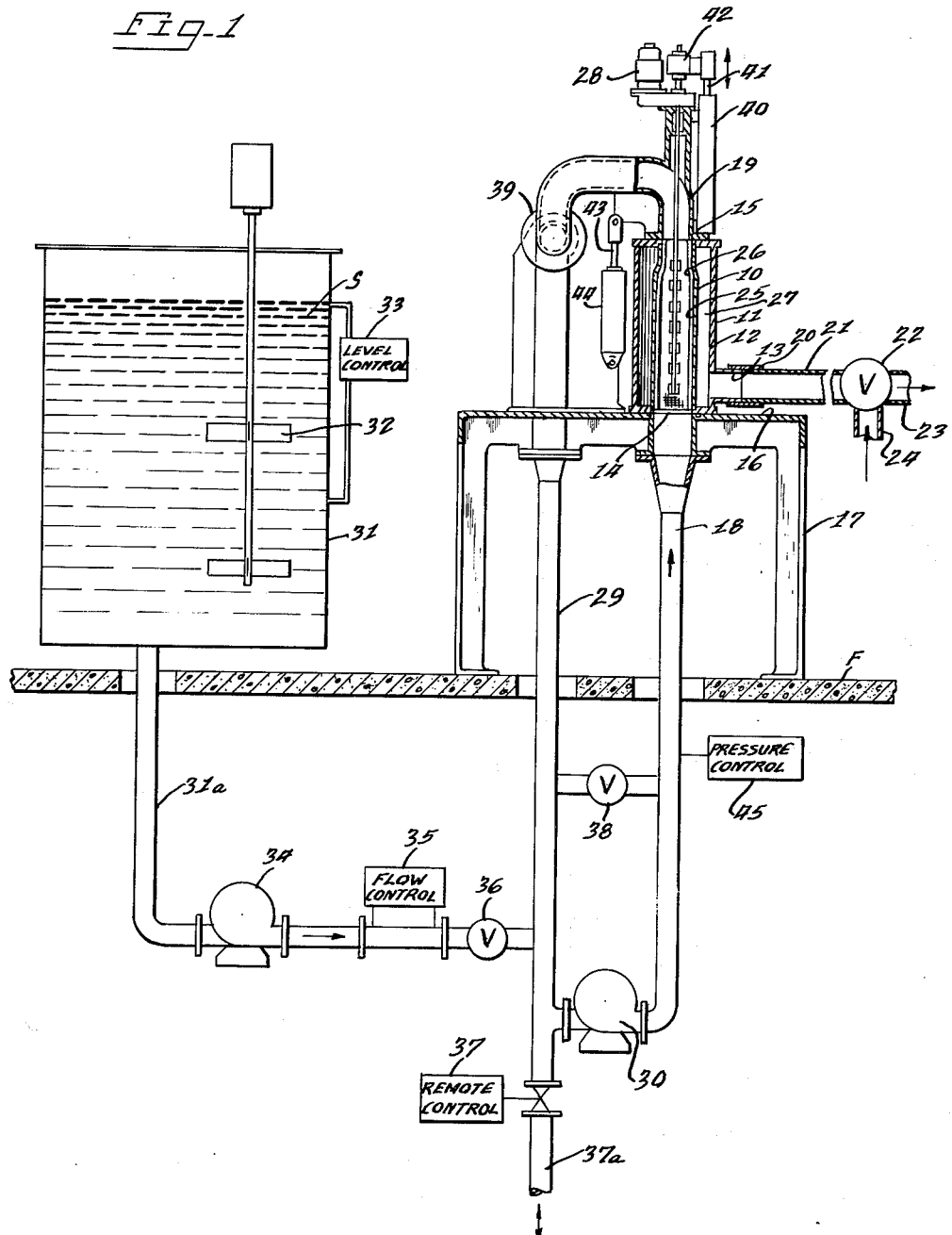
FIGURE 1 is a side elevational view shown in somewhat schematic form, with parts broken away, of mechanism at a station in the machine for forming a hollow shell.

As shown in FIGURE 1, the mechanism is arranged to provide a stock S in a controlled quantity and at a controlled rate of flow to a mold 10 which is illustrated as being tubular in shape and circular in cross section, and has a predetermined linear configuration tapering slightly inwardly at the upper end. The mold is supported within a housing 11 providing a chamber 12 surrounding the mold for the application of vacuum or pressure to the mold in order to create a pressure differential across the mold wall.

The mold is porous and is formed of the material such as individual glass beads coated with an epoxy resin to bind the beads together in the mold shape. A further description of a preferred form of mold material and the method of making the material is provided in the copending patent application of Charles W. Modersohn and Lloyd Hornbostel, Jr., entitled "Mold," U.S. Serial No. 89,451, filed February 15, 1961, now abandoned.

The fluid stock which is supplied to the interior of the mold may be of the general nature of stock used in the formation of paper. More particularly, the stock is preferably water with particles or fibers in suspension at a consistency of 0.01% to 2.0%, and a preferred consistency of 0.05% is employed. Particles or fibers suitable for the formation of the desired shell are in suspension in the water, and a preferred arrangement employs a Kraft pulp comprising 40% Kraft fibers and 60% cotton linters. This obtains a strong shell wall and provides features well suited for the mechanism and process to be described. The stock also may contain additional material such as a compatible resinous impregnant and/or binder, e.g., urea-formaldehyde or melamine-formaldehyde resins, cellulose esters and ethers, polyvinyl alcohols, etc.

Forming station

For depositing the stock in a uniform layer on the inner surface of the mold, the stock is flowed through the center of the mold at a low velocity to avoid washing the deposited layer. A velocity of 2 to 3 feet per second or less should be used.

The mold housing 11 has a vacuum connection 13, a stock inlet 14 and a stock outlet 15.

The housing with the mold 10 supported therein moves through a series of stations for different operations in the formation of the shell, which are arranged along the path. The path extends along a top surface 16 of a machine table 17. The mold housing is suitably supported and moved through the different stations of the path by a conveying mechanism which will be described.

For supplying stock to the interior of the mold 10, a mold supply conduit 18 is in alignment with the opening 14 at the bottom of the mold housing and a return conduit 19 is in alignment with the top opening 15 of the mold housing. The pressure in the vacuum chamber 12 is controlled by a pressure line 21 which connects to the housing connection 13 through a suitable means such as a sliding coupling 20, and the vacuum and air pressure line 21 may be moved along with the housing, or there may be a separate line provided at each station to be connected to the housing when it stops at the various stations. A control valve 22 is provided in the line 21 and the valve connects to a vacuum supply through line 23 and to a pressure supply through line 24, and these may be provided by suitable vacuum pumps and pressure pumps which are of conventional structure and need not be shown.

Stock dispersing means are provided within the mold 10 for an improved dispersion of the fibers within the liquid to aid distribution of the fibers as they collect on an inner smooth forming surface 25 of the mold. For this purpose a shaped tubular screen 26 is removably positioned within the mold 10 and the perforations in the screen cause a dispersion of the fibers just before they reach the forming surface 25. Also located centrally within the mold is a rotating agitator 27 driven by a motor 28.

Continued dispersion of the fibers to improve their deposition on the mold, and to avoid flocculation is also obtained by constant circulation of the stock. The stock returns through a down line 29 which passes through the floor F, and is continually circulated by a circulating pump 30.

In the arrangement of FIGURE 1 a predetermined quantity of stock is supplied to form a shell of a predetermined thickness. Stock S is supplied from a stock supply tank 31 having a power driven rotating agitator 32 therein. The level of the stock is controlled by a level control 33 which may be operated in coordination with a flow control 35 in a line 31a leading from the tank 31, to dispense a predetermined quantity of stock to the line 29. Stock is supplied by stock pump 34, and a shutoff valve 36 is positioned in the line 31a.

Before a shell is formed, a predetermined quantity of stock is fed into the line 29 and into the loop including conduits 18, 19 and 29. If the loop is not full the loop is then filled by water from a line 37a having a control valve 37 therein. While the loop is being filled, the housing chamber 12 is pressurized to avoid the formation of any layer of stock on the forming surface 25. When the loop has been filled with the mixture of stock and water, the valve 22 is operated to create a vacuum in the chamber 12 and the pressure differential across the mold 10 will force stock through the porous mold and deposit fibers to form a shell on the forming surface 25. The pressure differential is maintained for a period of time with the loop being kept full with a supply of water through the operations of the flow control valve 37. The measured amount of stock will cause a shell of a predetermined thickness to form. At the end of the shell forming time, the line 37a is connected to a dump conduit, and valve 37 is opened to permit the fluid in the loop to flow downwardly and drop below the level of the mold 10. A by-pass valve 38 is opened so that pump 30 can keep running. During operation when the shell is being formed, the by-pass valve 38 is of course closed, and a pressure control 45 may be used to maintain a uniform pressure of delivery of the stock to the mold 10 by the pump 30.

The discharge conduit 19 from the mold connects to the drop conduit 29 through a rotary connection 39 so that the conduit 19 can be swung upwardly away from the mold housing. The conduit 19, and the table surface 16 are provided with suitable annular seals so as to prevent leakage of fluid at the connections to the housing.

Prior to swinging the conduit 19 upwardly, the agitator 27 is raised by operation of a fluid cylinder 40 with a piston 41 therein connected to a head 42. The head 42 raises the agitator 27 when fluid is admitted to the bottom of the cylinder 40, and the conduit 19 is then swung upwardly by a cylinder 44 having a piston therein connected to a rod 43 pivotally attached to the conduit 19.

Figure 2:
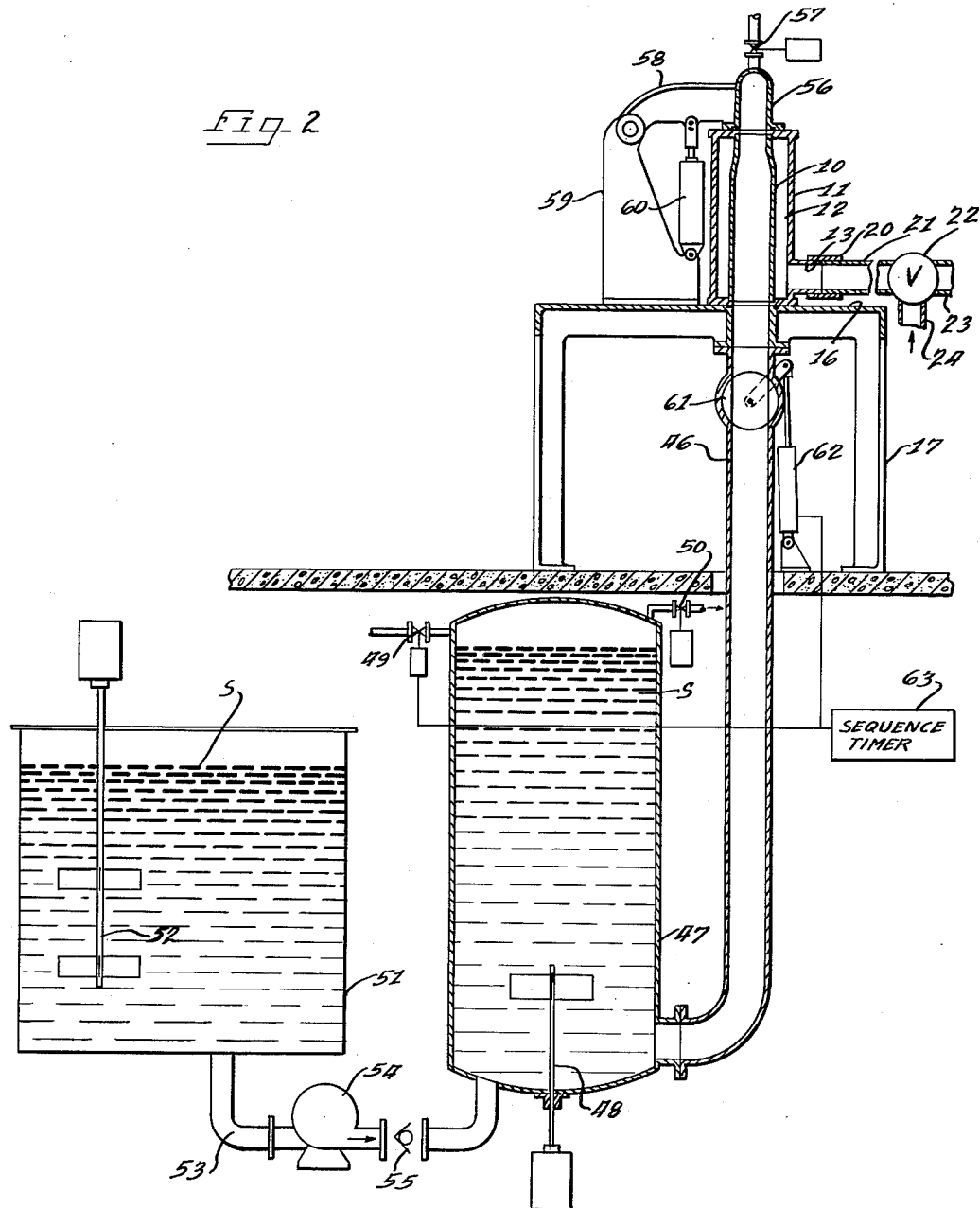
FIGURE 2 is a side elevational view similar to FIGURE 1 showing a modified arrangement for forming the shell.

FIGURE 2 shows a modified form of structure at the forming station with parts similar to FIGURE 1 being given similar numbers. Stock is supplied to the mold 10 by a stock supply line 46 connected to a stock pressure tank 47 having an air head at the top and having a power driven agitator 48 therein. Air is supplied to the top of the tank at a predetermined constant temperature through a control valve 49, and a pressure release bleed valve 50 is also connected to the tank top. By maintaining the air at a constant pressure, the stock S in the tank is supplied to the mold at a uniform pressure. This improves the deposition of fibers on the forming surface of the mold 10, and permits accurate control of the thickness of the wall of the shell by timing the supply of stock to the mold 10.

Stock is supplied to the pressure tank 47 from a supply tank 51 having a rotating agitator 52 therein. A line 53 connects between the tanks 51 and 47, and a supply pump 54 pumps the stock S to the tank 47. A check valve 55 is located in the line 53.

An air dome 56 is positioned at the top of the housing 11. The air dome has a vent valve 57, and is supported on a pivotal arm 58 mounted on a bracket 59. A piston and cylinder 60 hold the air dome in place during forming of the shell, and raise the air dome out of the way when the shell and housing are moved to the succeeding station.

For forming the shell, a valve 61 is opened by a piston and cylinder 62 controlled by a sequence timer 63.

When the valve 61 is opened to permit the flow of stock up to the mold 10, the vent valve 57 is also opened so that the stock can rise within the mold. The housing chamber 12 is pressurized to prevent depositing of fibers on the mold wall before the mold is completely filled with stock. When the mold is filled, the vent valve 57 is closed, and valve 22 is shifted to create a vacuum in the housing chamber 12 to cause the flow of liquid through the mold 10.

Figure 7:
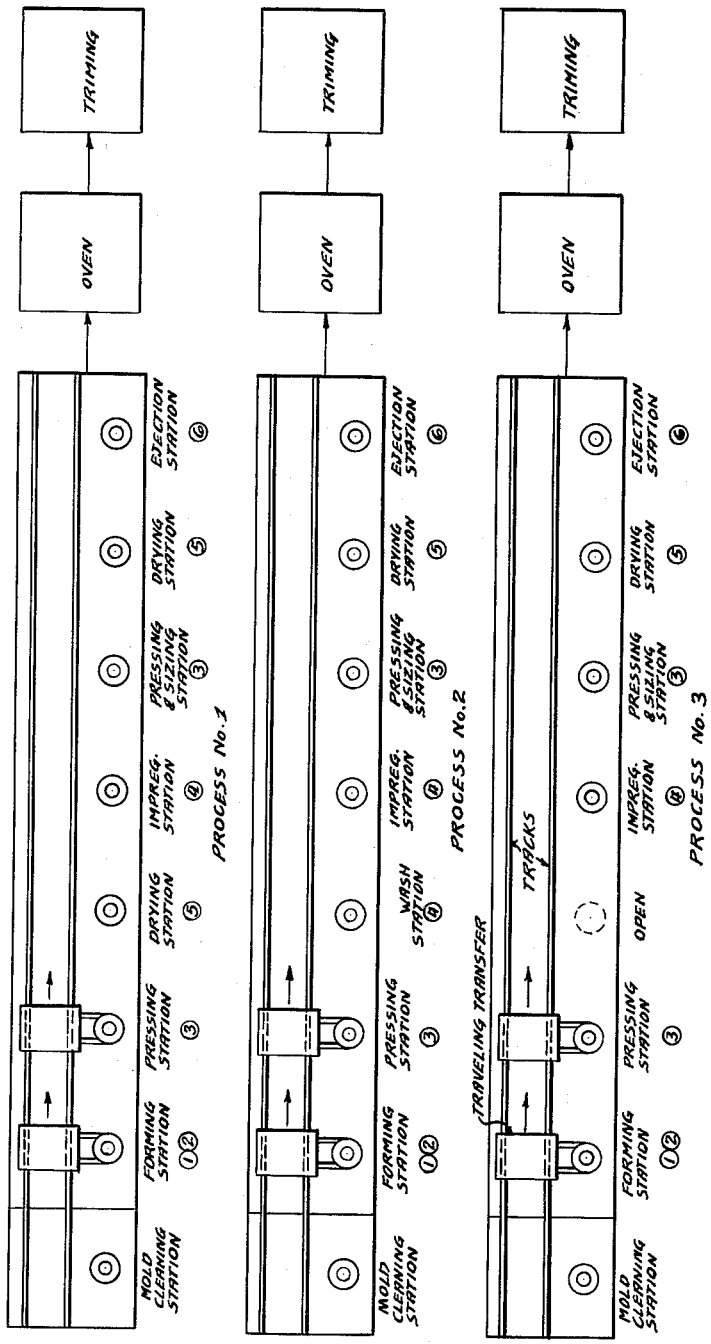
FIGURE 7 is a diagrammatic showing separate processes for forming shells utilizing the mechanism of the stations of FIGURES 1 through 6.

FIGURE 7 illustrates in schematic plan view the sequence of stations along the path, and shows different process steps, as labeled, for three separate processes. The circled numbers below the steps of the process refer to the figures of the drawings and the structures thereof. For example, in each process, the forming station has numbers 1 and 2 indicated, which means that the structures of FIGURES 1 and 2 may be employed in that station. Similarly in the pressing station of each of the processes the numeral 3 appears and this indicates that the structure of FIGURE 3 may be employed in this step, and similarly, the other steps indicate the structures which may be employed.

*Pressing station*

Figure 3:
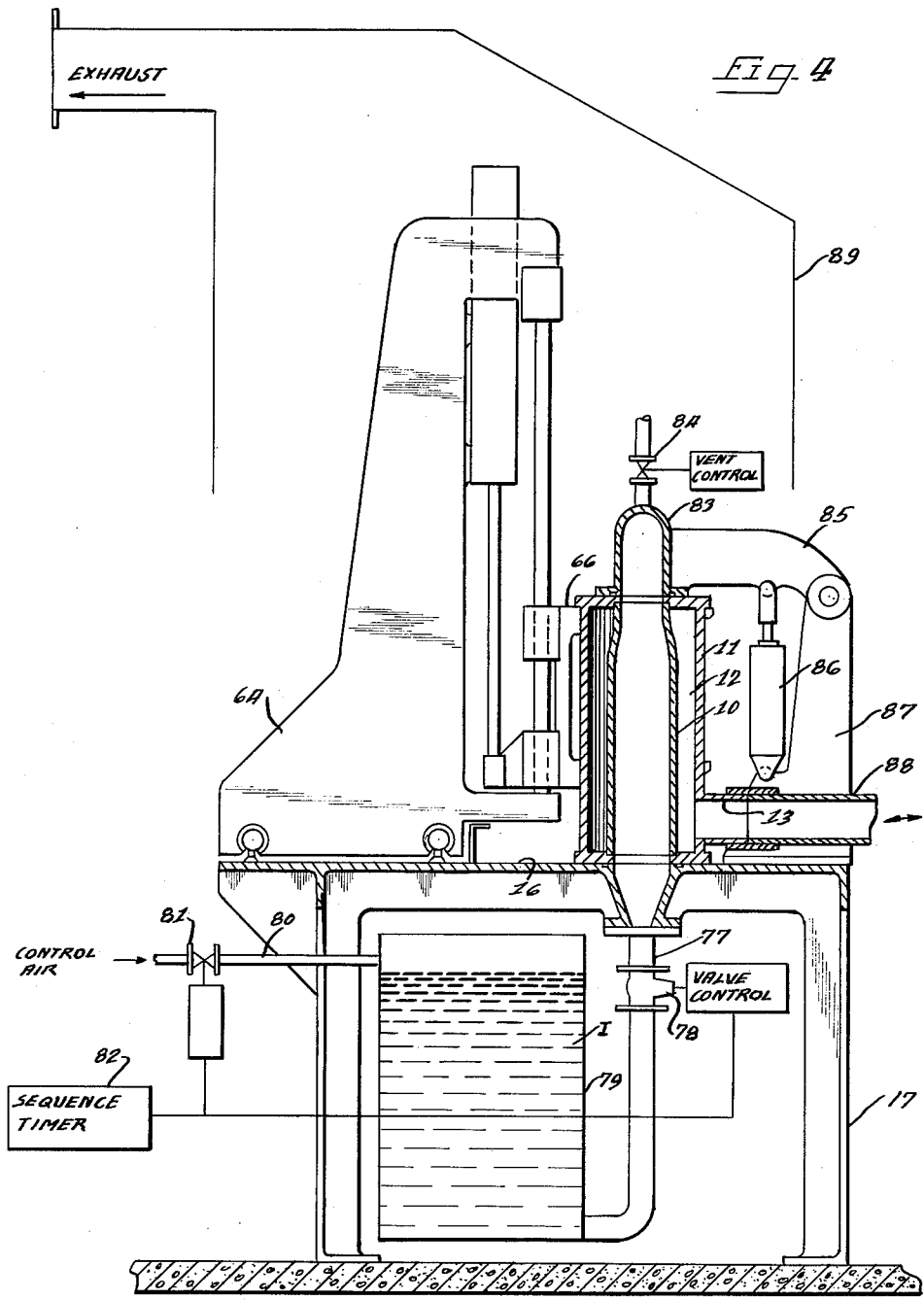
FIGURE 3 is a sectional view taken through the machine showing a station for pressing the shell.

The structure of FIGURE 3 performs a pressing operation for flattening the fiber mat and squeezing moisture therefrom, applying a surface pressure to the inner exposed surface of the shell and pressing it outwardly against the smooth forming surface 25 of the mold 10. The mold housing 11 is carried along the stations of the machine by a traveling transfer or carrier 64 arranged to slide on longitudinal rods or ways 65, and moves therealong by suitable power means, not shown. The housing is supported on the carrier 64 by a head 66 which is arranged with a gripper or connecting means to grip the housing 11 securely, and release it at the end of the path to move back to the head of the machine for gripping another housing.

The head 66 is slidably mounted on a vertical guide rod 67 for vertical reciprocation to lift the housing off the surface 16 as it moves between stations, and to firmly lower the housing to the table surface 16 at the stations. A cylinder 68 is mounted on the carrier with a piston therein connected to a piston rod 69 connected to the head 66, and the cylinder is provided with suitable fluid connections for lifting the head. A control mechanism for timing the functions of this unit may take various forms which need not be shown in detail as will be appreciated by those skilled in the art. For example, a cam shaft rotated by timing motor and having a plurality of operating cams therealong may operate control switches for operating the various parts in their appropriate sequence and for the proper times.

At the station of FIGURE 3, the agitator 27 and screen 26 have been removed from the mold 10, and an inflatable elongated bladder 70 is inserted into the center of the mold 10. The bladder is mounted on a vertical spindle 71 having a lower portion 72 with air emission openings, which pressurize the interior of the bladder to force it outwardly against the inner surface of the shell. Air is directed to the interior of the bladder through an air line 75 controlled by a valve 75a operated by a sequence timer 76.

The bladder is axially inserted into the open lower end of the mold 10 for operation, and withdrawn therefrom in order to move the housing to the next station, by a piston rod 73 connected to a piston slidable within a cylinder 74 which has suitable connections and may be operated by a valve connected to the sequence timer 76.

*Impregnation station*

Figure 4:
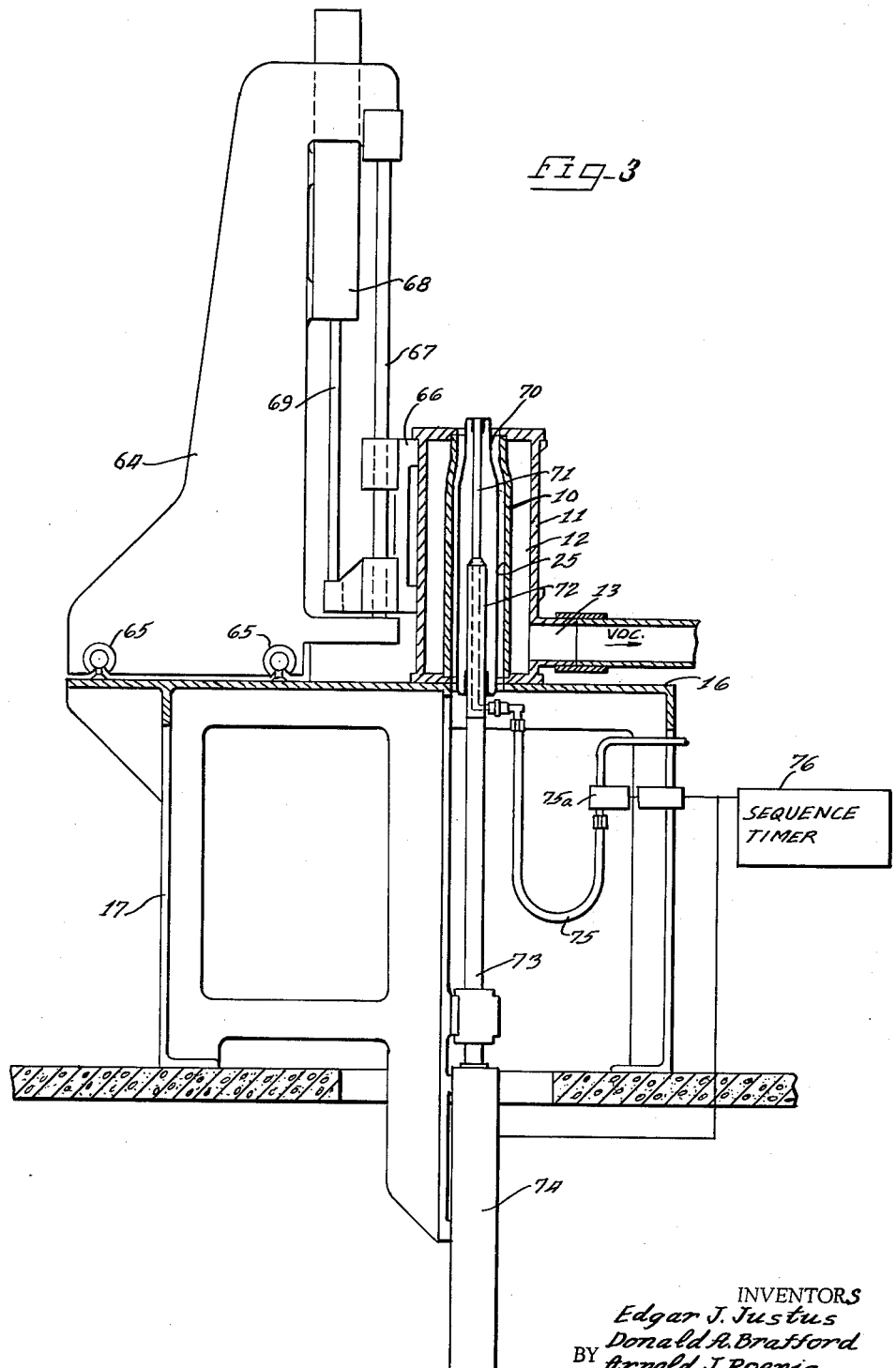
FIGURE 4 is a vertical sectional view taken through the machine showing a station for impregnating the shell with a binder.

In FIGURE 4 the shell supported within the mold 10 is impregnated with an impregnating or binding fluid. This fluid may be a solution of a compatible resinous impregnant and/or binder, e.g. urea-formaldehyde or melamine-formaldehyde resins, cellulose esters and ethers, polyvinyl alcohols, etc. The resin may be in a 1% to 10% organic solvent solution or in aqueous emulsion.

The mold housing 11 is positioned in the impregnation station in alignment with an opening in the table 16 communicating with an impregnant supply line 77 controlled by a valve 78. The line is connected to an impregnant tank 79 containing an impregnating liquid I. The tank is pressurized through an air line 80 leading to the upper end, and air pressure is controlled by a valve 81 operated by a sequence timer 82, which is also connected to the control valve 78.

Above the mold housing 11 an air dome 83 is positioned having a vent control valve 84 connected thereto. The dome 83 is mounted on a pivotal valve 85 supported on a bracket 87, and the dome is pivoted to the operative position shown, or pivoted out of the way of the housing, by a piston and cylinder 86, the cylinder being connected to suitable pressure operating lines.

The chamber 12 within the housing is first pressurized through an air-vacuum line 88 and impregnant is admitted within the shell within the mold 10. The vent control valve 84 is opened so that the impregnant can completely fill the inside of the shell, and then closed. The chamber 12 is then subjected to a vacuum through line 88, and the impregnant penetrates the shell for a predetermined period of time. The impregnant is then drained out of the shell by relieving the pressure above the impregnant tank 79, and the housing 11 is moved onto to the next station. An overhead exhaust hood 89 carries away fumes from the impregnant.

*Drying station*

Figure 5:
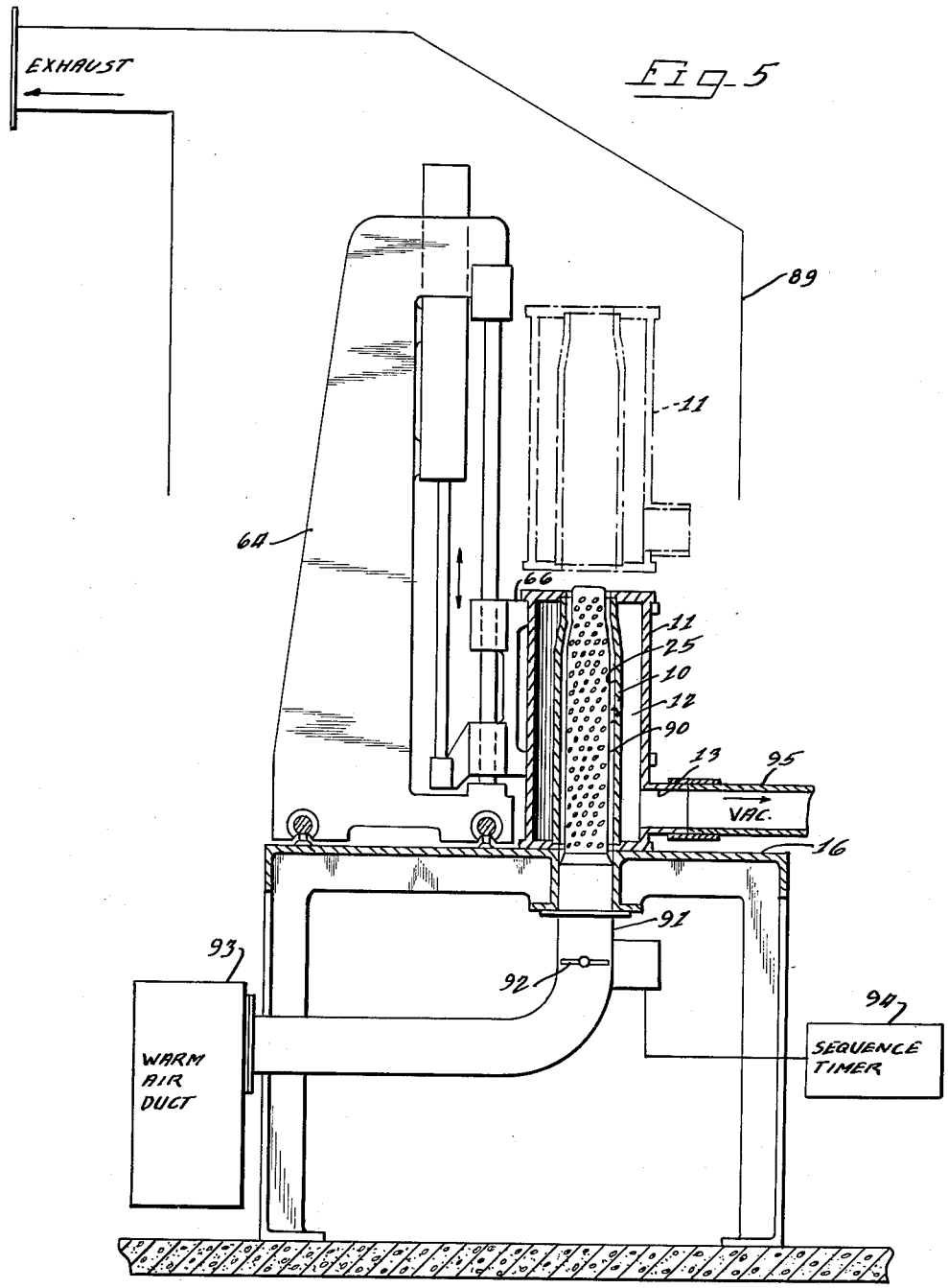
FIGURE 5 is a vertical sectional view taken through the machine showing a station for drying the shell.

In FIGURE 5 an elongated cylindrical perforate drying member 90 is axially inserted upwardly into the shell within the mold 10. The interior of the drying member 90 is connected to a warm air line 91 having a valve 92 therein, controlled by the sequence timer 94. The sequence timer 94 is part of the same operating mechanism shown at 76 and 82 in FIGURES 3 and 4, and labeled "sequence timer" therein, but for convenience is provided with a separate number inasmuch as the unit will be operated through independent switches and operating mechanism although it may be operated in timed relationship to the other sequence timers.

Warm air is supplied to the line 91 from a warm air supply duct 93. The warm air is directed outwardly through the perforations in the drying member 90 for a predetermined controlled length of time to evaporate moisture from the inner surface of the shell. The drying is controlled and is terminated before the outer surface of the shell, which is in contact with the inner forming surface 25, is completely dry. This facilitates separation of the shell from the forming surface. The pressure in the housing chamber 12 is reduced through the vacuum line 95.

The housing 11 is lifted vertically off of the drying member 90 and then moved laterally to the next station.

*Ejection station*

Figure 6:
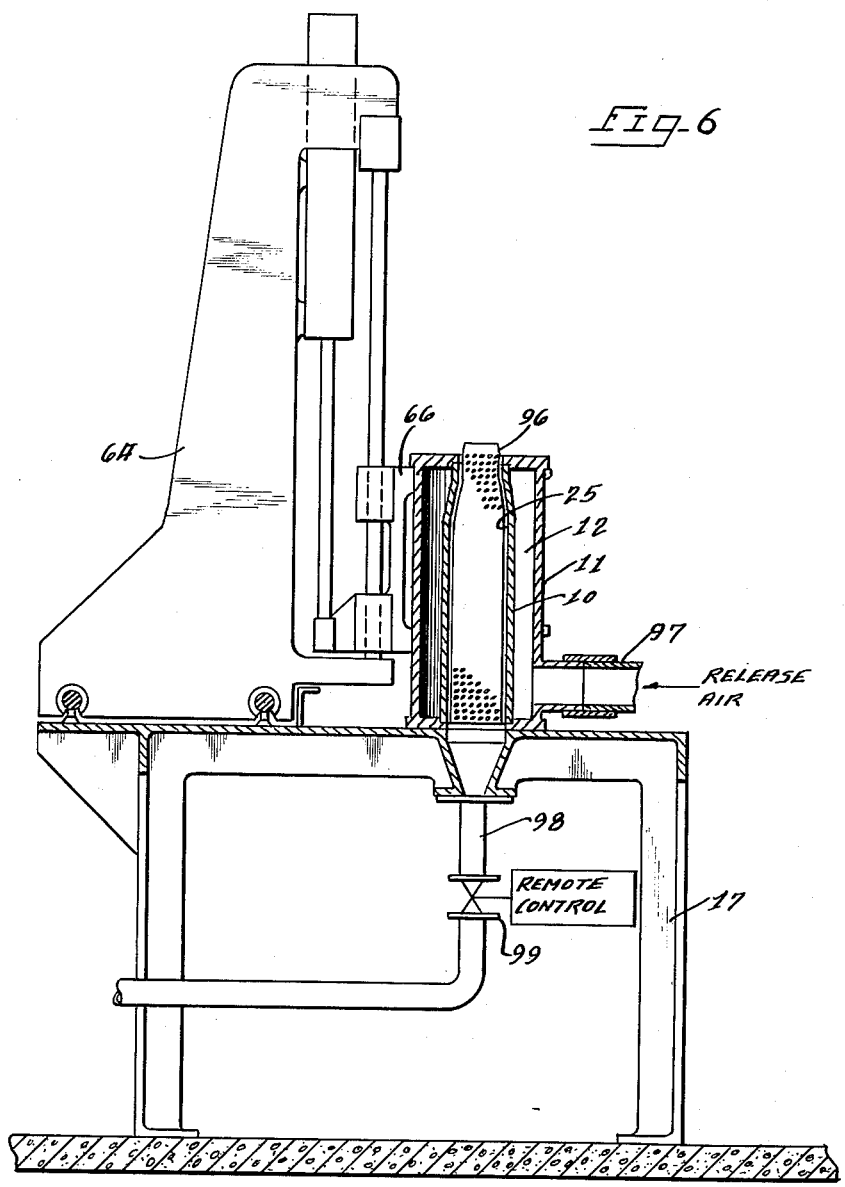
FIGURE 6 is a vertical sectional view taken through the machine showing a station for removing the shell from the mold.

In FIGURE 6 the housing is lowered to position the shell within the mold 10 over a support mandrel 96. The mandrel has a perforated outer surface and a hollow interior to be connected to a suction line 98 controlled by a valve 99. The housing chamber 12 is pressurized through a release air line 97.

A feature of the process of transferring the shell from the mold 10 to the mandrel 96 resides in controlling the drying of the shell so that the outer surface remains moist thereby permitting release of the outer surface of the shell from the finishing surface 25 of the mold.

When the shell is transferred to the mandrel 96, the housing and mold 10 are removed, and the shell is then carried to the oven, as shown in the processes of FIGURE 7. Inasmuch as the mold 10 is slightly tapered, and the mandrel 96 fits snugly within the shell, and the inner surface of the shell has been dried and its dimensions fixed, the shell now has an accurate outer diameter and an accurate circular cross section. The size and shape will have been accurately and positively determined by the inner forming surface 25 of the mold due to the fibers originally having been deposited on the mold, and having been pressed and sized thereagainst in the pressing and sizing station.

FIGURES 8 through 11

In the mechanism of FIGURES 8 through 11, a mold is contained within a mold housing 103 supported on a head 104 by gripping arms 105 which clamp the head and which are actuated by pistons and cylinders 106a.

The head is supported on a traveling carrier 100 supported for movement along the processing path on overhead rails or ways 101a and 101b. The rails are supported on an overhanging stand 101 connected to a table or bench 102 which has the processing stations therealong.

Figure 8:
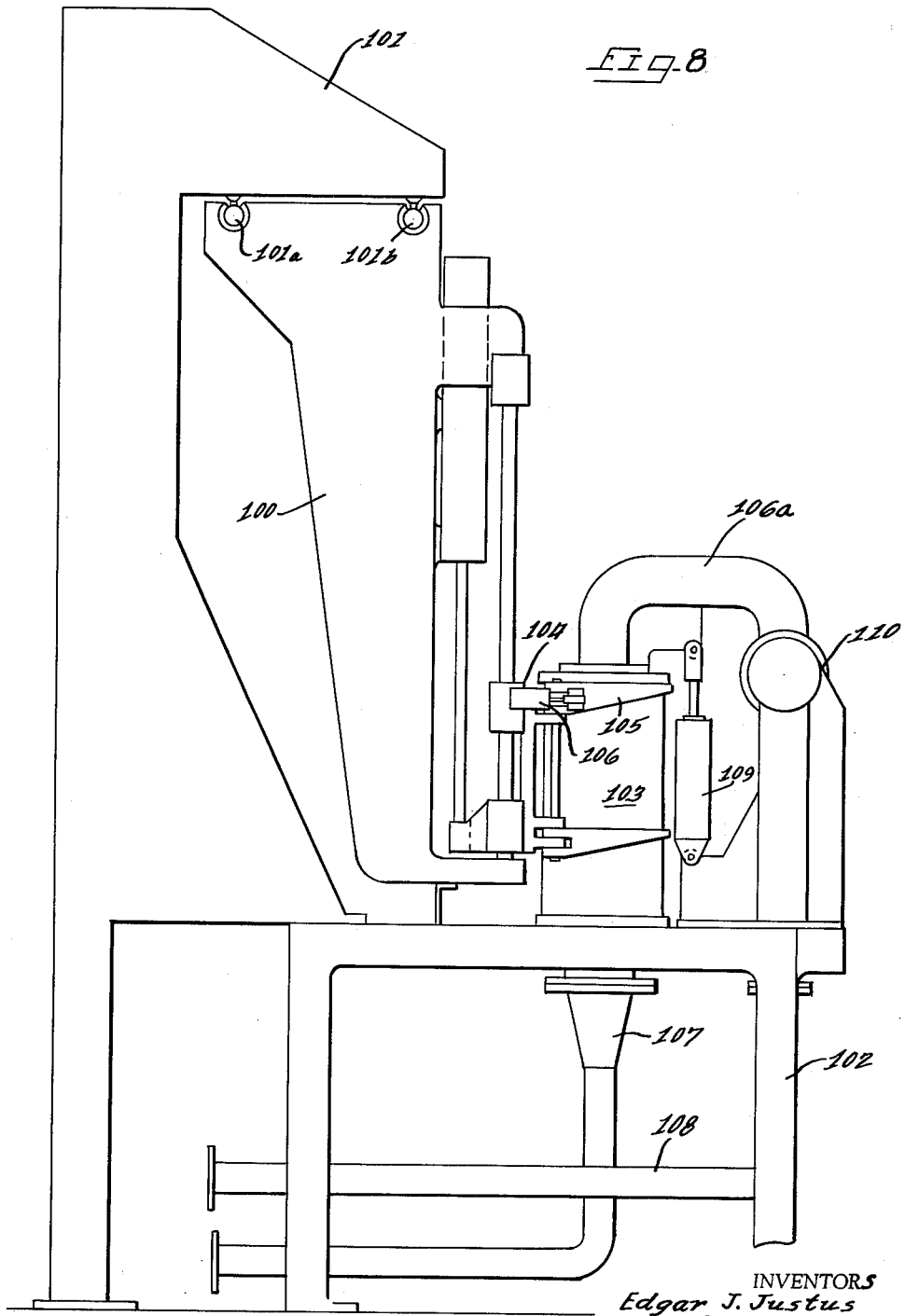
FIGURE 8 is an end elevational view of a form of mechanism for the mold.
Figure 9:
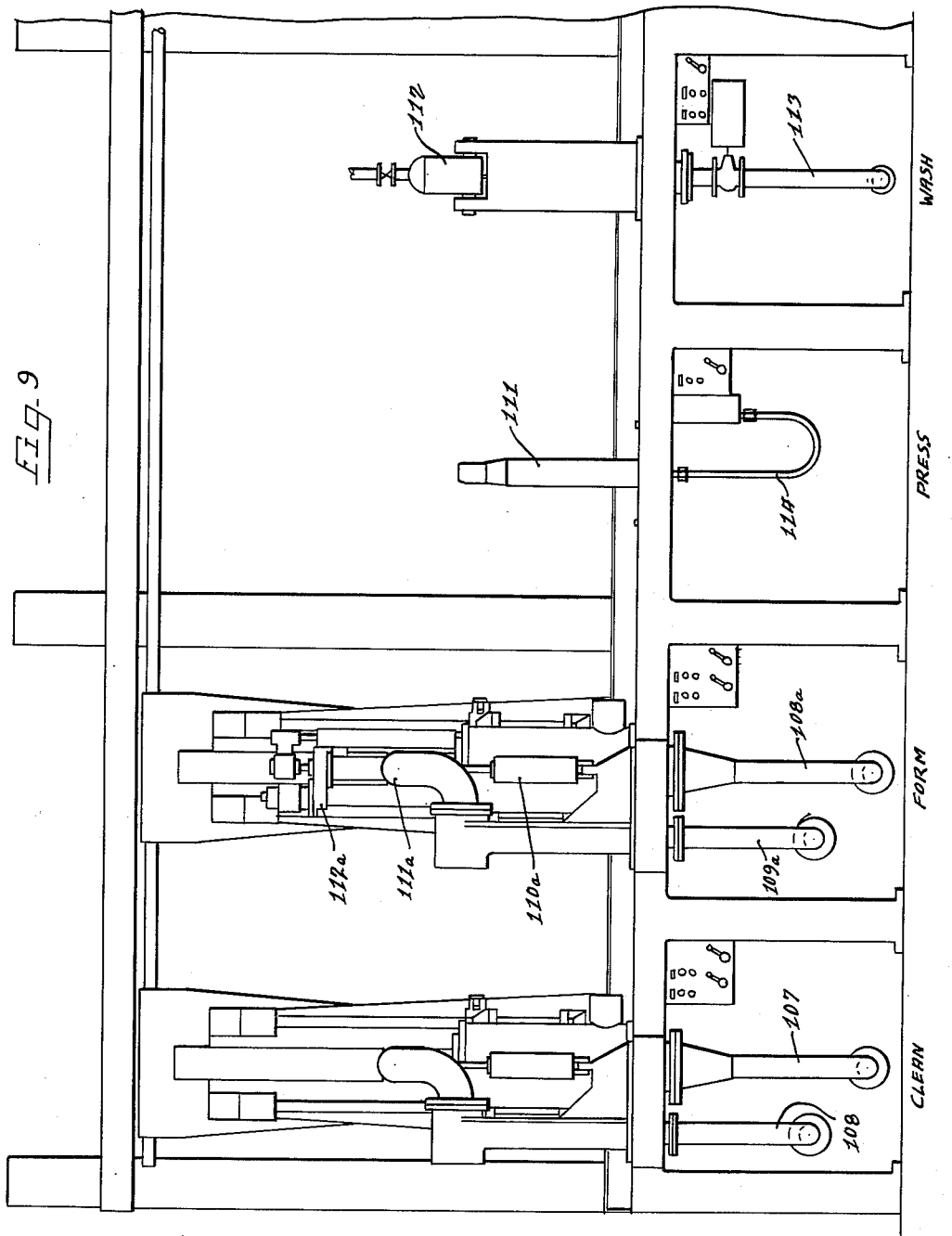
FIGURE 9 is a front elevational view of a portion of the machine of FIGURE 8, showing the first four stations of the machine.
Figure 11:
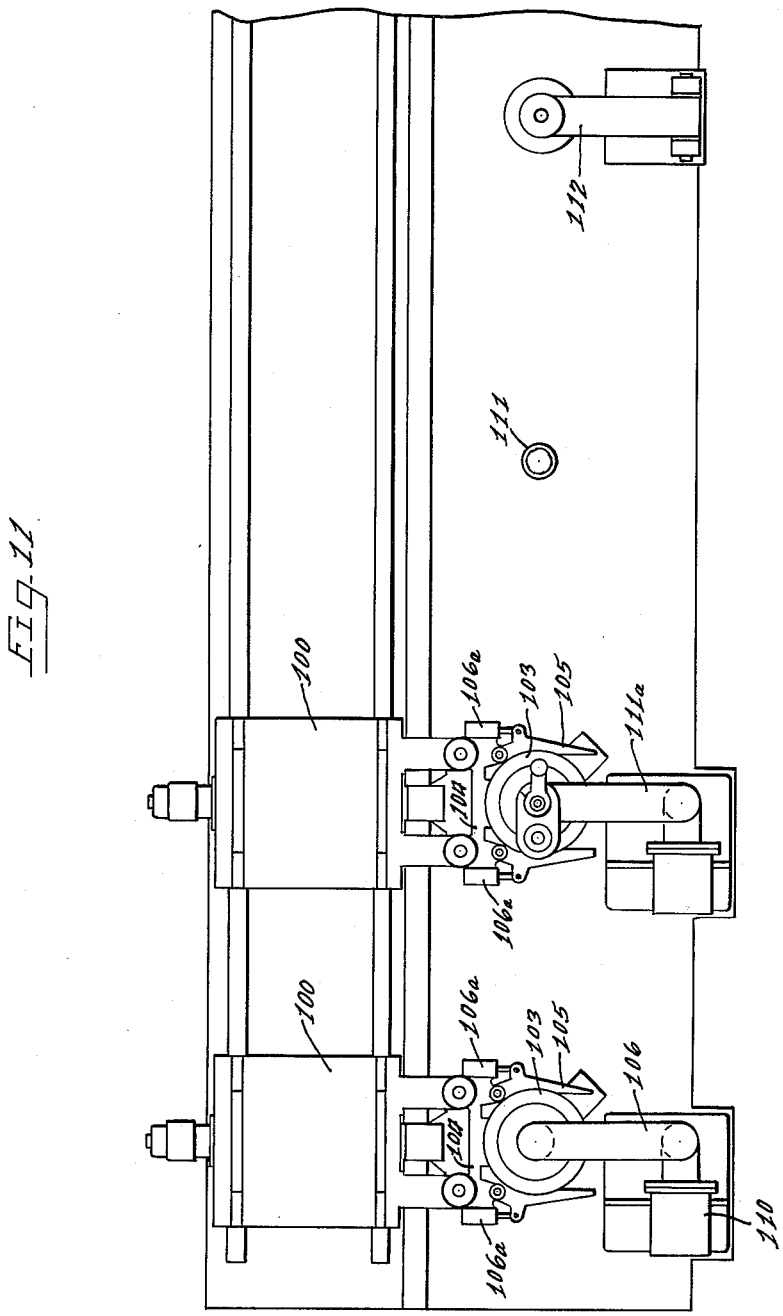
FIGURE 11 is a top plan view of the mechanism of FIGURE 9.

The first station, shown in FIGURE 8, and shown at the far left in FIGURES 9 and 11, is the mold cleaning station, as also shown in the processes of FIGURE 7. In this station fluid is flushed through the mold to clean the surface, and the chamber of the housing 103 around the mold may be pressurized by a line, not shown, for cleaning the mold finishing surface. A flush of cleaning fluid may be delivered through line 107 and returned through line 108. Line 107 is aligned with the mold, which is within the housing 103, through an opening in the top of the bench 102, and line 108 is connected through an outlet conduit 106 which is pressed to the top of the mold, and is connected to line 108 through a rotary connection 110. The line 106 is held against the top of the mold by a piston and cylinder operator 109.

The mold and its housing 103 are then carried to the next station, which is the second from the left in FIGURES 9 and 11. This is a forming station and stock is supplied to the mold through a line 108a in a continuous flow with the circuit being completed by return line 109a. The return line connects to the mold housing 103 through an overhead conduit 111a and the conduit is clamped to the top of the mold housing 103 by a piston and cylinder operator 110a. A supply of stock is obtained from mechanisms such as that shown in FIGURES 1 and 2, the mechanism shown being one having an agitator assembly 112a similar to the arrangement of FIGURE 1.

The carrier 100 then carries the mold to the third station from thet left in FIGURES 9 and 11 over the inflatable bladder 111 which is supplied with air under pressure from a line 114. This presses liquid from the formed shell and sizes the shell against the inner forming surface of the mold. This step follows process No. 2 of FIGURE 7 incorporating the pressing station, and as will be subsequently described, the wash station.

The next step utilizes impregnation equipment the same as illustrated in FIGURE 4. A washing solution is supplied to the center of the mold through a supply line 113 and an overhead air dome 112 is provided with a valve to permit the washing liquid to completely fill the interior of the mold. A vacuum is applied to the chamber outside of the mold, and at the end of the washing operation the washing liquid is drained from the mold, and the mold moved to the next impregnation station which is shown in FIGURE 10.

This again employs apparatus similar to that shown in detail in FIGURE 4, with an impregnating liquid being supplied through a line 117 to the center of the mold, and being permitted to rise up into the mold by an air dome 115 vented by a valve 116.

The mold is then transferred to the press station; the mold is lowered over an inflatable bladder 118 supplied with air through a pressure line 119, and the bladder is inflated to again press and size the shell by applying a pressure to its exposed surface and pressing it outwardly against the smooth inner forming surface of the mold.

Figure 10:
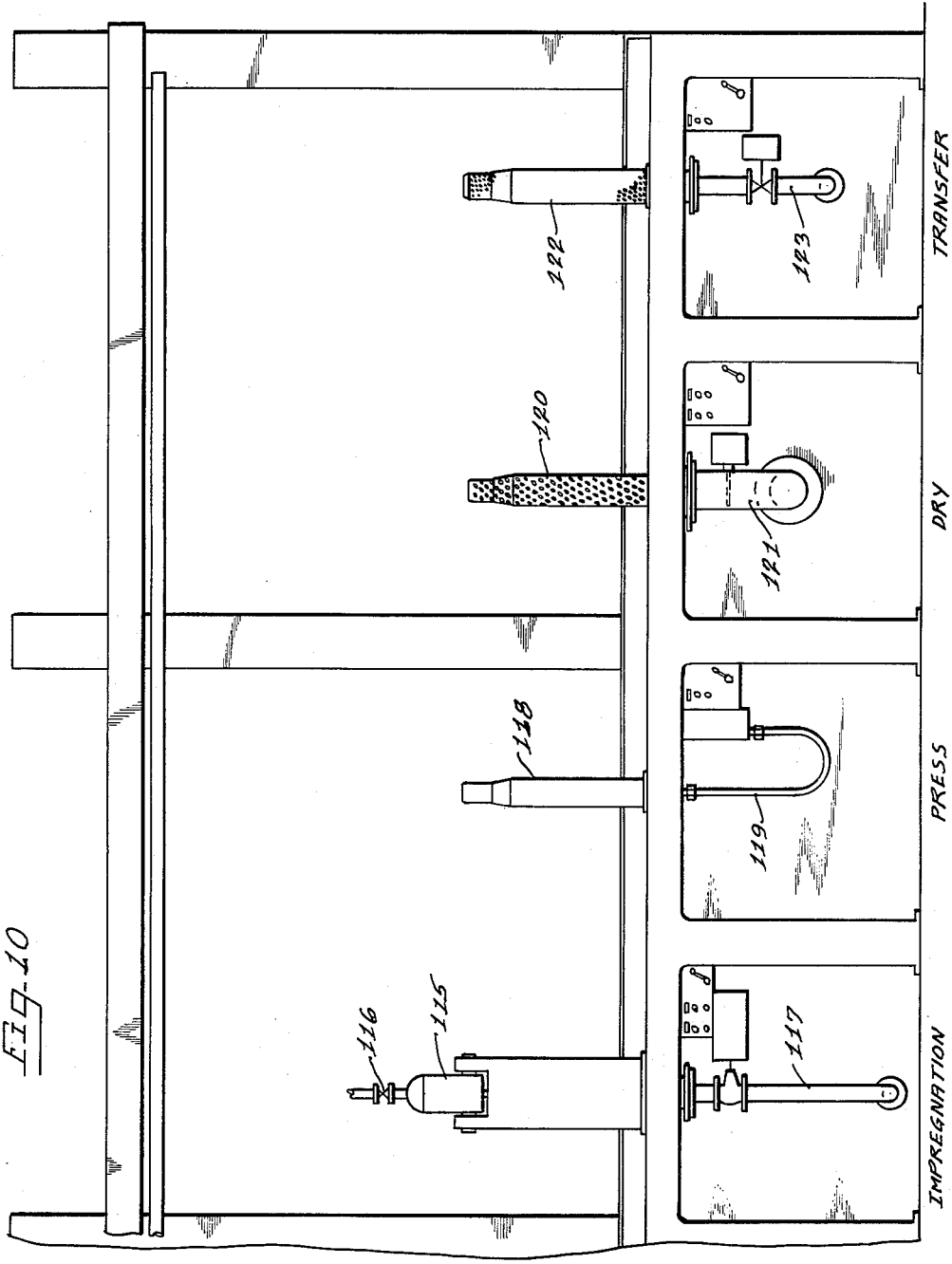
FIGURE 10 is a front elevational view of the machine of FIGURES 8 and 9 showing the last four stations of the machine, and is to be viewed in conjunction with FIGURE 9.

The mold is next carried to the drying station, as shown in FIGURE 10, wherein a perforated drying member 120 axially enters the center of the shell, and is supplied with drying air through a line 121. This equipment is similar to that shown in FIGURE 5. After the shell has become adequately dry, but leaving the outer surface thereof slightly moist for transfer, the shell supported within the mold is moved to the transfer station. At that station a perforate mandrel 122 axially enters the shell, and as previously described, the mandrel is subjected to a vacuum through line 123, and the housing chamber surrounding the mold is pressurized. The mold is then lifted and separates from the shell, with the shell being supported on the mandrel 122.

FIGURES 8 through 11 illustrate operational elements arranged in stations along a processing path, with the elements being of substantially the same construction as shown in FIGURES 1 through 6, but arranged in a modified order so as to carry out process No. 2 as shown in FIGURE 7.

Figure 12:
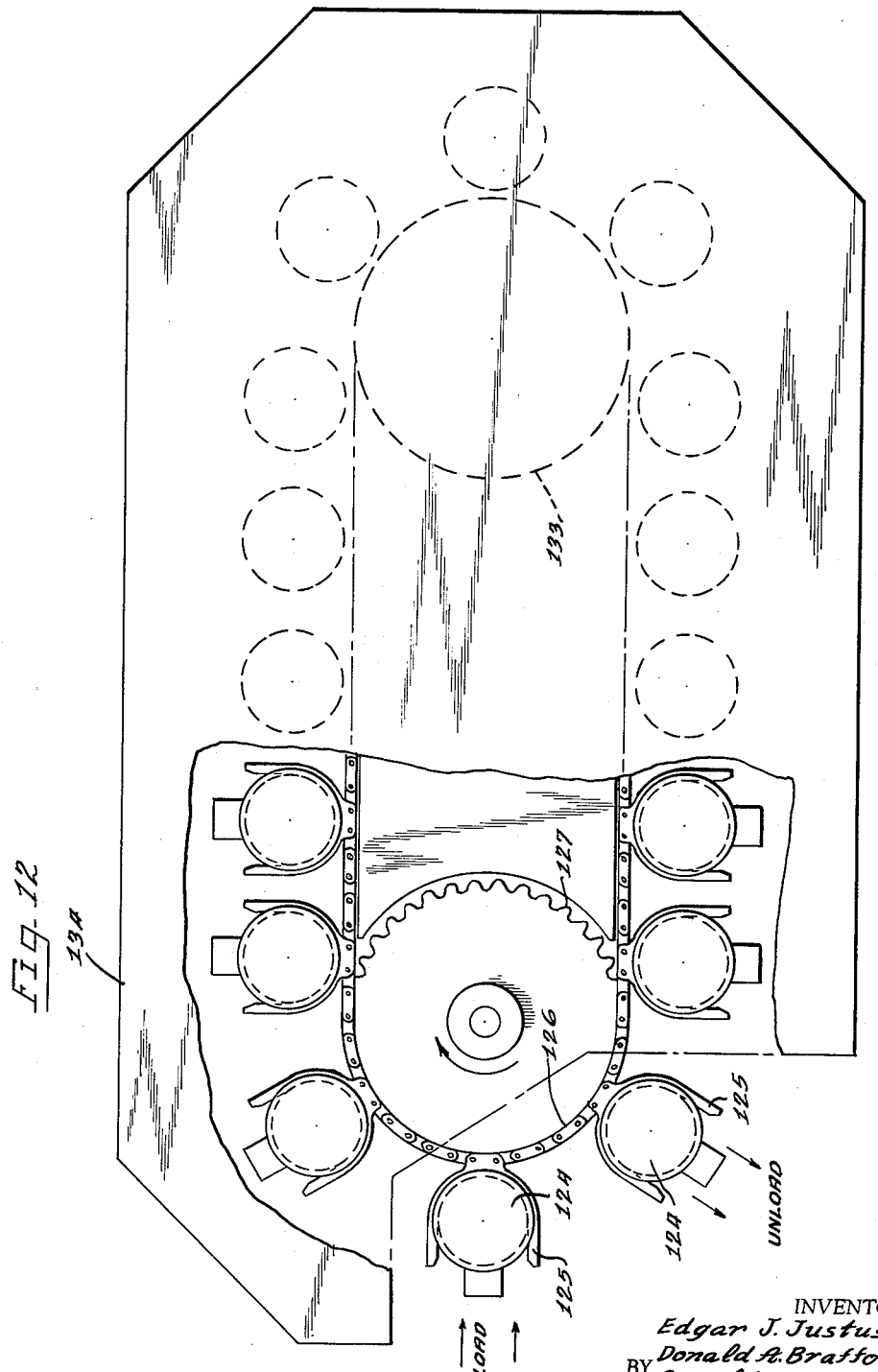
FIGURE 12 is a top plan view, with parts broken away, showing a drying mechanism for the machine.
Figure 13:
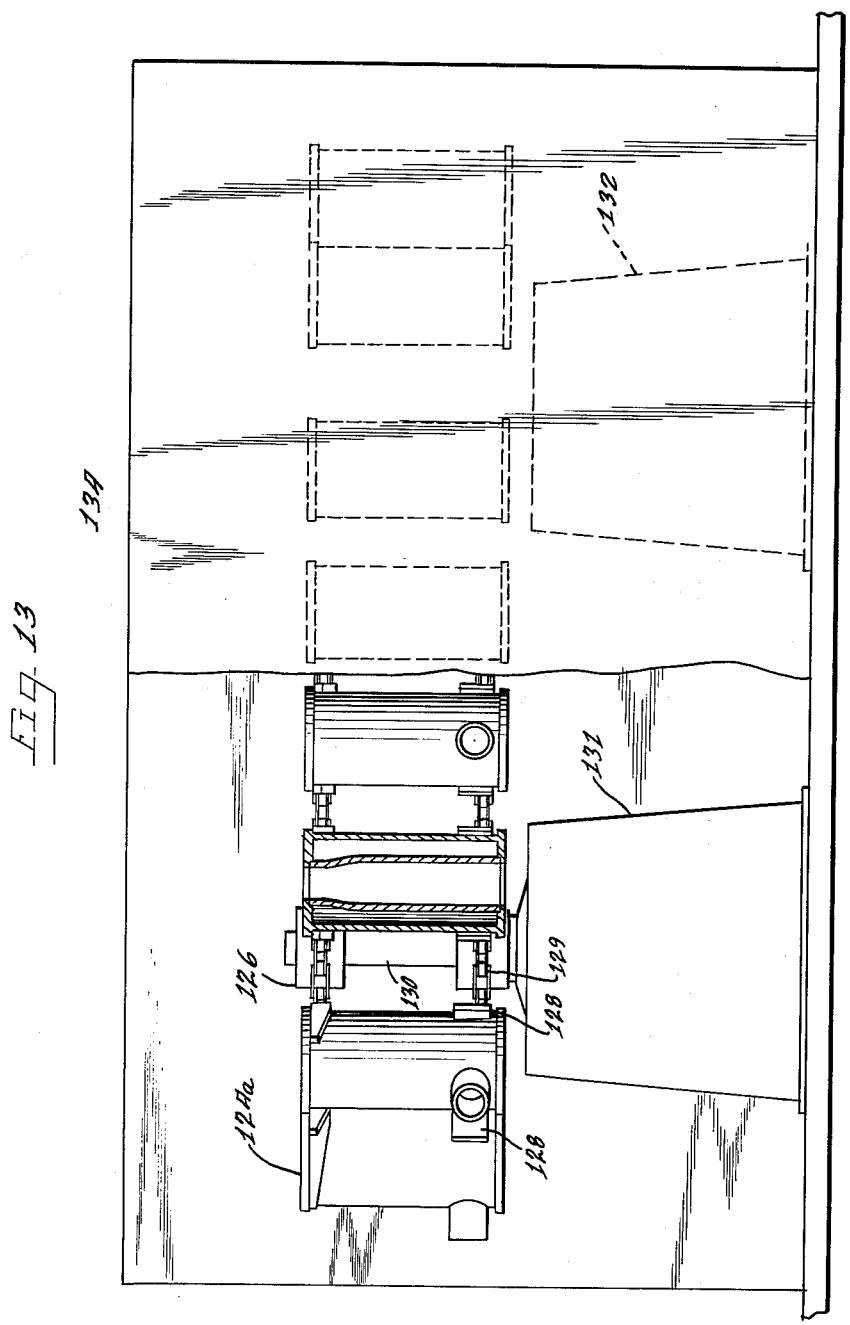
FIGURE 13 is a side elevational view, with parts broken away showing the drying mechanism of FIGURE 12.

FIGURES 12 and 13

The drying operation at the drying station in the process shown as process No. 1 in FIGURE 7 may take longer than other steps in the formation of certain shells, and to expedite handling, a drying arrangement may be provided such as that shown in FIGURES 12 and 13 which accommodates a longer drying time but does not slow up the processing in other steps.

The mold housings 124 will be delivered to the drying enclosure after shells have been formed and pressed therein, and they will be received at the place shown at "Load." The housings will be received by upper U-shaped support arms 125 and lower U-shaped guide arms 128. The upper arms engage underneath flanges 124a at the top of the housings. The upper arms are supported on an endless chain 126 and the lower arms are supported on a similar endless chain 129. The upper chain is supported on sprockets 127 and 133 which are spaced and the chain travels in an elongated endless loop beneath a hood 134 which is supplied with heated air from a suitable source. The sprockets for the upper and lower chains at one end are supported on a bearing column 130 mounted at the top of a base 131. A similar base 132 is provided for a bearing column and sprockets, not shown, at the other end of the looped chains.

After traveling through the hood 134, the housings are delivered at the place marked "Unload." Drying in the oven has conditioned the shells for removal from the molds, and they have retained dimensional stability since they were supported by the molds during the drying process. The very slight contraction of the shells due to their drying, and the very slight enlargement of the mold due to its being heated causes the outer surface of the shell to separate from the forming surface of the mold so that transfer can be accomplished to a supporting mandrel.

FIGURES 14 through 17

The structure of these figures illustrates mechanism for transferring formed shells to a supporting mandrel and impregnating the shells. The mechanism employs an indexing turret and the shells are received from a conveying means 135, FIGURE 14. Prior to being received by the turret the shells have been formed, pressed and dried such as by mechanism shown in FIGURES 1, 2, 3 and 5. In this process, impregnation is accomplished from the outer surface of the shell, and the process follows the steps of process No. 1 FIGURE 7 except that transfer occurs between the drying station and the impregnation station.

Figure 14:
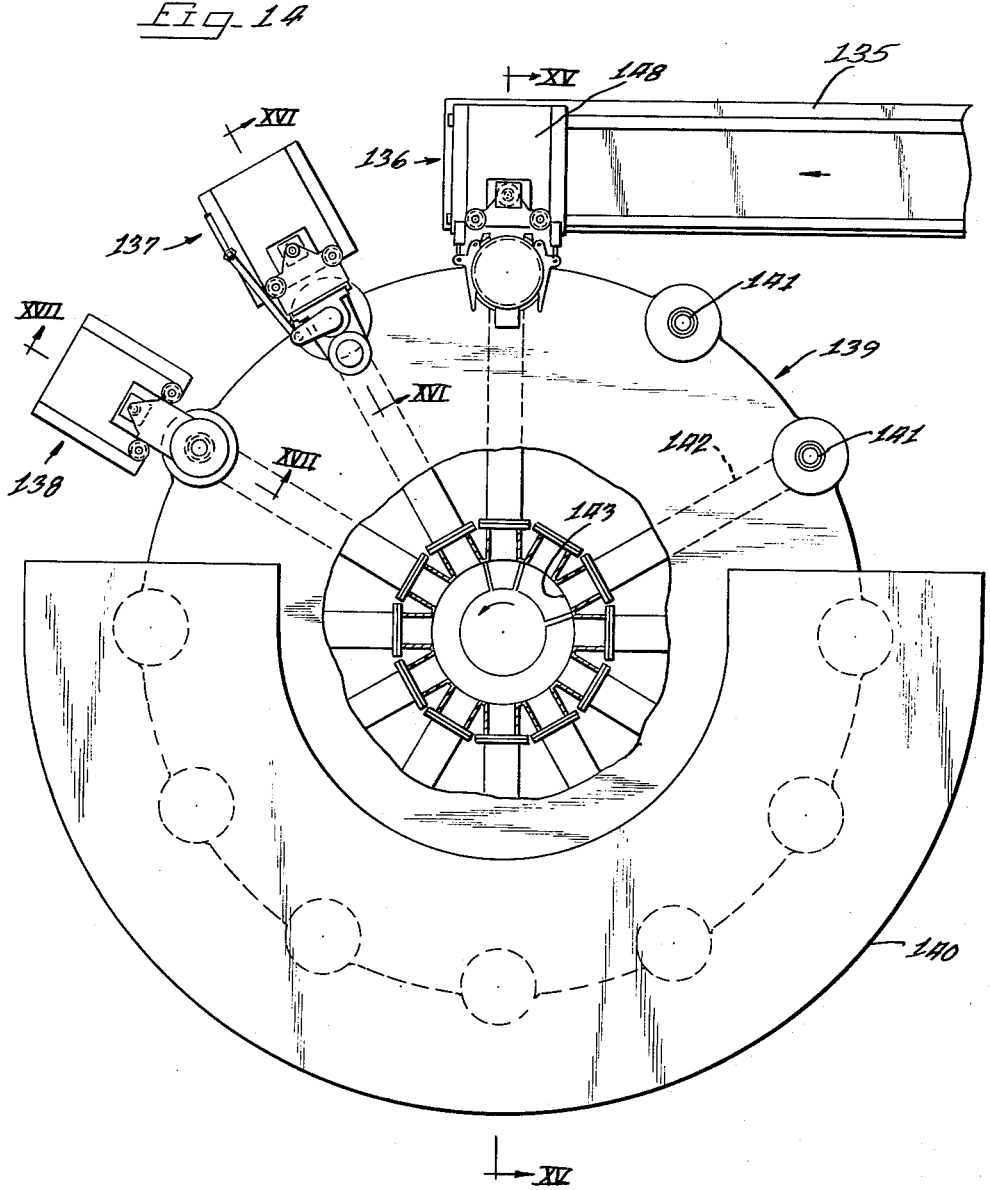
FIGURE 14 is a top plan view showing a modified form of mechanism for performing some of the steps in the manufacture of the shells.
Figure 15:
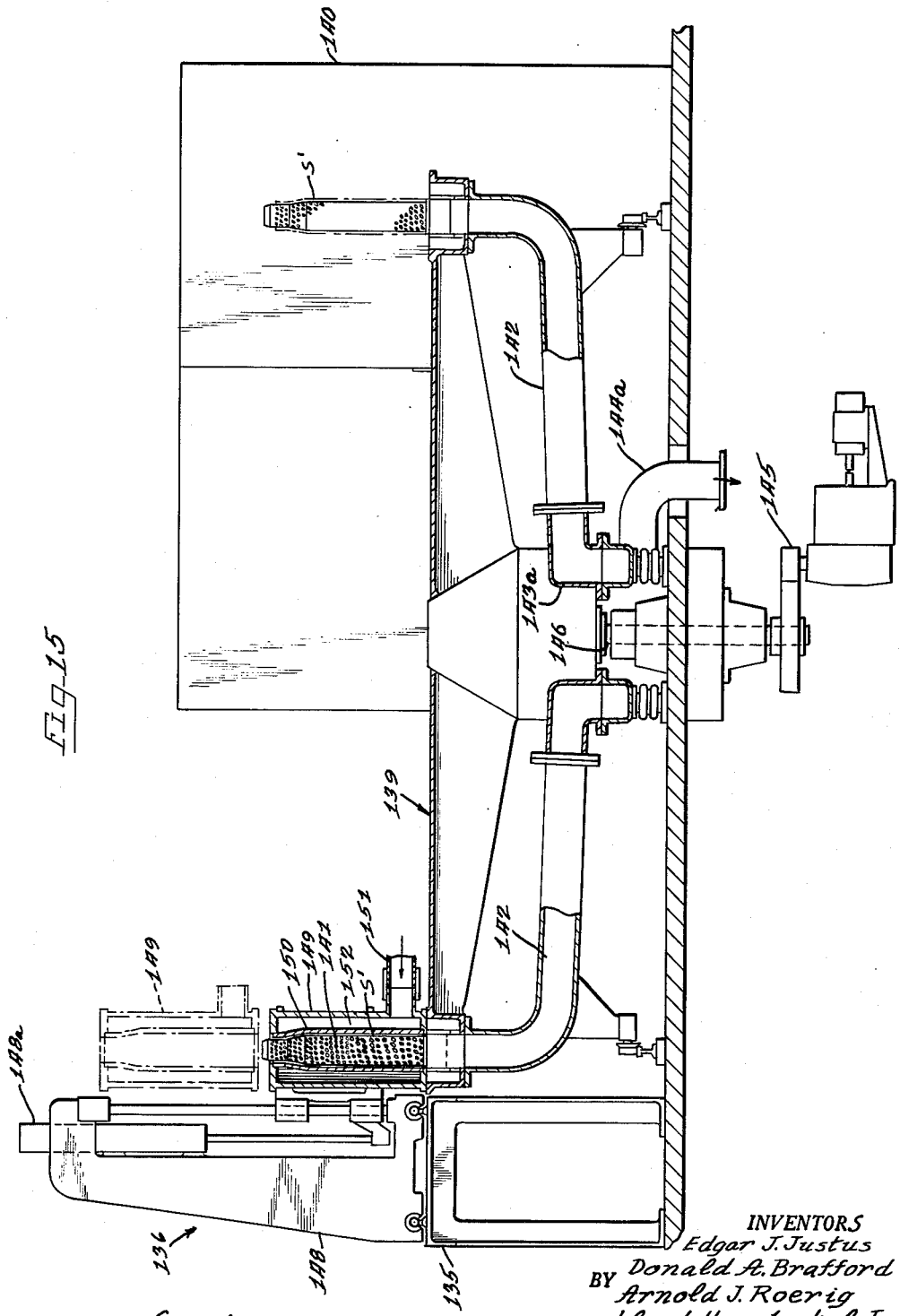
FIGURE 15 is a vertical sectional view taken substantially along line XV—XV of FIGURE 14.

On the turret the mold passes through a transfer station 136, FIGURES 14 and 15; an impregnation station 137, FIGURES 14 and 16, and a pressing and sizing station 138, FIGURES 14 and 17.

The turret 139 supports a plurality of mandrels 141 at circumferentially spaced positions. Leading to each of the mandrels are air lines 142 for applying a suction, and the air lines are connected at their inner ends to connections which connect the lines to a suction line, or vent the lines to air for removal of the shells from the mandrels. The mandrels are perforated so as to hold the shells thereto when suction is applied to the mandrel interiors.

The turret 139 is rotatably supported on a central shaft 146 and driven in intermittent indexing advancing motion by an indexing drive mechanism 145 which may take various forms known to the art and, for example, a Geneva drive may be used.

After the shell has been sized at the station 138, it is carried through a drying hood 140 which extends for a substantial distance around the turret.

At transfer station 136, a carrier 148 has moved a housing 149 with a mold 150 therein into place. Within the mold is a formed shell S'. The housing is moved downwardly from the dotted line position to the solid line position over the perforated support mandrel 141. The housing is lowered by piston and cylinder operator 148a.

For transferring the shell S', pressure is applied to the chamber 152 outside of the mold 150 through a line 151, and vacuum is applied to the inside of the mandrel through the line 142. The housing 149 and mold are then raised to the dotted line position, and the turret 139 is indexed to carry the shell S' to the impregnation station 137.

At the impregnation station a stand 143a supports an impregnant hood 144a. The hood is supported and moved up and down by a piston and cylinder operator 145 which connects to a supporting head 146. Within the hood 144 are a plurality of axially and circumferentially spaced impregnant applying spray jets 147 with impregnant being supplied under pressure from a supply line 149. An inner shell 150 within the hood supports the spray jets 147, and is rotated during spraying by drive motor 148. The impregnant is of the type above described in connection with the impregnating mechanism of FIGURE 4, and penetrates the shell. Suction is applied to the inside of the mandrel 141 during impregnation. At the end of the impregnation operation, the cylinder 145 raises the hood 144, and the turret 139 is indexed to position the shell at the pressing and sizing station 138.

At the pressing and sizing station of FIGURE 17, a stand 151 supports a vertically movable pressing and sizdie 153. The die is mounted on a head 155 which slides on a guide rod 154 and is vertically reciprocated by a cylinder and piston 152. The die 153 is moved axially downwardly from the dotted line position to the solid line position over the tapered shell, and the inner sizing surface 156 presses and sizes the shell S against the mandrel 141. Vacuum continues to be applied to the inside of the mandrel through line 142. The sizing die 153 is then raised, and the turret is indexed to carry the shell S supported on the mandrel 141 through the drying hood 140, FIGURE 14. When the shell emerges from the hood 140, it is removed from its mandrel, and atmospheric air is admitted to the interior of the mandrel, or the mandrel may be pressurized to aid the removal of the shell.

It will be understood that in the process of making the shells, different combinations of mechanisms for the different stations may be employed. In addition to the mechanisms shown in FIGURES 1 and 2 for forming the shell, it is contemplated that a centrifugal casting or forming method may be employed. This would require supplying stock to the interior of a tubular mold which would be rotated so that centrifugal forces on the stock fibers would aid in depositing them on the inner forming surface of the mold. Stock would be supplied in either a predetermined quantity, or for a predetermined time to form the shell. Where the shape of the mold is such that the diameter along the shell length is not the same, there is a tendency of the shell to form in nonuniform thicknesses. This can be avoided by control of the flow of stock or supply of stock to the mold wall so that the same quantity of fibers are deposited along the length of the mold regardless of mold diameter, and a shell of uniform thickness can be obtained. Suitable means will be provided for rotating the mold about its central axis during forming of the shell with rotary connectors for connecting to the stock flow lines. Rotation, for example may be given the mold at 1500 r.p.m. for a period of three minutes or less, depending on the factors involved.

Thus it will be seen that we have provided an improved molding system for manufacturing molded articles of accurate and uniform outer size and dimension and of uniform wall thickness. The method and apparatus meet the objectives and afford the advantages above set forth and are well adapted to production manufacturing operation.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. In a mechanism for forming a hollow shell, the combination comprising a porous shaped mold having a forming surface on which particles are deposited, supply means for forcing a fluid stock having particles in suspension through the mold to deposit particles on the mold surface, and a shaped screen conforming to the shape of said forming surface positioned immediately adjacent the forming surface so that the stock flows through the screen immediately before reaching the forming surface.

2. A mechanism for forming a thin walled tubular shell comprising a porous shaped tubular mold having an interior forming surface on which particles are deposited, a stock supply system having an upstream conduit connected to one end of the mold and a downstream conduit connected to the other end of the mold with said conduits being connected, means for circulating stock through said conduits, and a supply means connected to maintain a flow of stock in the conduits.

3. A mechanism for forming successive thin walled shells comprising a porous shaped mold having a forming surface on which particles are deposited, an enclosing housing supporting the mold and having a pressure connection communicating with the housing and the forming surface of the mold, and a vacuum connection communicating with the housing and the other surface of the mold, a forming station having a stock supply means for fluid stock with particles in suspension and having a vacuum means, said supply means and said vacuum means positioned to connect to the pressure connection and vacuum connection respectively on the mold housing for depositing said particles on the mold forming surface, means for moving the mold from the forming station and locating another mold in position in the station, and means for intermittently controlling said supply means and vacuum means for forming a shell on each mold that is positioned in said station.

4. In a mechanism for forming a shell, the combination comprising a porous shaped tubular mold having an interior forming surface on which particles are deposited and being open at each end, a supply means for positioning on one end of the mold and communicating with the opening in said one end, and a closed hollow air dome positioned at the other end of the mold forming an air chamber communicating with the opening in said other end.

5. The mechanism of claim 4 including an air vent valve in communication with said air dome.

6. A mechanism for forming a shell comprising a porous shaped tubular mold having a mold wall including an interior forming surface on which particles are deposited, stock supply means for forcing a fluid stock having particles in suspension through the mold wall to deposit the particles on the mold surface to form the shell, dispersing means adjacent said forming surface for dispersing the particles as they flow to the surface, means for inserting and withdrawing said dispersing means from the mold, an inflatable elastic bladder for positioning adjacent the exposed surface of the shell, means for inflating said bladder for applying a surface pressure to the shell forcing it against said forming surface, means for withdrawing the bladder from the mold, means for forcing a flow of impregnating binder into the shell on the mold, and means for providing a pressure differential across the mold surface with a lower pressure on the exposed surface of the shell for separating the shell from the mold.

7. A mechanism for forming shells comprising a porous shaped mold having a mold wall including a forming surface on which particles are deposited, supply means for forcing a fluid stock having particles in suspension through the mold wall to deposit particles on the mold surface to form the shell, a closed housing supporting the mold and having a stock connection communicating with the forming surface of the mold and an air connection communicating with the other surface of the mold, a plurality of forming and curing stations positioned along a path having stock supply means and air drying means at predetermined stations for joining to said stock connection, and having vacuum and pressure connections at predetermined stations along the path for joining to said air connection, and a carrier adapted for connection to said housing for transporting the housing along the path through said stations.

8. A mechanism for forming shells comprising a porous shaped mold having a mold wall including a forming surface on which particles are deposited, supply means for forcing a fluid stock having particles in suspension through the mold wall to deposit particles on the mold surface to form the shell, a closed housing supporting the mold and having a stock connection communicating with the forming surface of the mold and an air connection communicating with the other surface of the mold, a plurality of forming and curing stations positioned along a path having stock supply means and air drying means at predetermined stations for joining to said stock connection, and having vacuum and pressure connections at predetermined stations along the path for joining to said air connection, a carrier adapted for connection to said housing for transporting the housing along the path through said stations, and releasable gripping means on the carrier for supporting the housing in its travel along said path.

9. A mechanism for forming a shell comprising a mold having a porous wall with a forming surface on which particles are deposited, stock supply means for forcing a fluid having particles in suspension through the mold wall to deposit the particles on the mold surface to form the shell, a housing supporting the mold, a drying enclosure for drying the shell on the mold, means for transporting the housing and mold from the supply means to the drying enclosure, a conveyor having a plurality of housing supports thereon moving through said drying enclosure for receiving the housing from the transporting means and carrying a series of housings through the enclosure.

10. A mechanism for forming a shell comprising a porous shaped tubular mold having a mold wall including an interior forming surface on which the particles are deposited, stock supply means for forcing a particle carrying stock through the mold wall to form the shell, a perforate elongated mandrel for insertion into the mold, means for delivering a flow of drying air into the mandrel to remove moisture from the shell while within the mold, and means for removing the mold from the shell so that the shell is supported on the mandrel.

11. A mechanism for forming a shell comprising a porous shaped tubular mold having a mold wall including an interior forming surface on which the particles are deposited, stock supply means for forcing a particle carrying stock through the mold wall to form the shell, a perforate elongated mandrel for insertion into the mold, means for delivering a flow of drying air into the mandrel to remove moisture from the shell while within the mold, means for removing the mold from the shell so that the shell is supported on the mandrel, and means for directing an impregnating fluid in engagement with the outer surface of the shell on the mandrel.

12. A mechanism for forming a shell comprising a porous shaped tubular mold having a mold wall including an interior forming surface on which the particles are deposited, stock supply means for forcing a particle carrying stock through the mold wall to form the shell, a perforate elongated mandrel for insertion into the mold, means for delivering a flow of drying air into the mandrel to remove moisture from the shell while within the mold, means for removing the mold from the shell so that the shell is supported on the mandrel, a sizing die having a tubular interior sizing surface, and means moving the sizing die into engagement with the outer surface of the shell on the mandrel.

References Cited by the Examiner

UNITED STATES PATENTS

| | | | |
|---|---|---|---|
| 1,211,229 | 1/17 | Pruyn et al. | 162—391 |
| 1,342,184 | 6/20 | Rauer | 162—226 |
| 1,848,055 | 3/32 | Chaplin | 162—407 |
| 2,000,085 | 5/35 | Maginnis | 162—229 |
| 2,149,879 | 3/39 | Mitchel | 162—229 |
| 2,398,016 | 4/46 | Lemont et al. | 162—415 |
| 2,481,486 | 9/49 | Abbott | 162—407 |
| 2,921,336 | 1/60 | Crafton. | |
| 2,925,863 | 2/60 | Chaplin | 162—391 |
| 2,938,582 | 5/60 | Chaplin | 162—224 |
| 2,958,623 | 11/60 | Harshberger | 162—220 |
| 2,990,314 | 6/61 | Leitzel | 162—220 |
| 3,043,742 | 7/62 | Chaplin | 162—219 |

FOREIGN PATENTS

| | | |
|---|---|---|
| 17,796 | 1911 | Great Britain. |
| 52,904 | 10/33 | Denmark. |
| 827,254 | 2/60 | Great Britain. |

DONALL H. SYLVESTER, *Primary Examiner*.

MORRIS O. WOLK, *Examiner*.